(12) United States Patent
Papania

(10) Patent No.: US 9,726,236 B2
(45) Date of Patent: Aug. 8, 2017

(54) MULTI-MODE CLUTCH MODULE

(71) Applicant: BorgWarner Inc., Auburn Hills, MI (US)

(72) Inventor: James Ronald Papania, Bolingbrook, IL (US)

(73) Assignee: BorgWarner Inc., Auburn Hills, MI (US)

( * ) Notice: Subject to any disclaimer, the term of this patent is extended or adjusted under 35 U.S.C. 154(b) by 194 days.

(21) Appl. No.: 14/762,829

(22) PCT Filed: Jan. 27, 2014

(86) PCT No.: PCT/US2014/013127
§ 371 (c)(1),
(2) Date: Jul. 23, 2015

(87) PCT Pub. No.: WO2014/120595
PCT Pub. Date: Aug. 7, 2014

(65) Prior Publication Data
US 2015/0354640 A1 Dec. 10, 2015

Related U.S. Application Data

(60) Provisional application No. 61/758,356, filed on Jan. 30, 2013.

(51) Int. Cl.
*F16D 41/16* (2006.01)
*F16D 41/14* (2006.01)
(Continued)

(52) U.S. Cl.
CPC .............. *F16D 41/14* (2013.01); *F16D 11/16* (2013.01); *F16D 25/00* (2013.01); *F16D 41/12* (2013.01);
(Continued)

(58) Field of Classification Search
CPC .......... F16D 41/14; F16D 41/12; F16D 43/14; F16D 43/16; F16D 25/00; F16D 2043/145; F16D 11/16; F16D 41/125
See application file for complete search history.

(56) References Cited

U.S. PATENT DOCUMENTS 5,170,870 A * 12/1992 Kampf .................... F16D 41/12
188/82.2
5,992,592 A 11/1999 Showalter
(Continued)

FOREIGN PATENT DOCUMENTS

CN 101096982 A 1/2008
CN 102224355 A 10/2011
(Continued)

OTHER PUBLICATIONS

International Search Report Application No. PCT/US2014/013127; reported on May 8, 2014.
(Continued)

*Primary Examiner* — Ramya Burgess
*Assistant Examiner* — Lillian Nguyen
(74) *Attorney, Agent, or Firm* — Miller, Matthias & Hull LLP

(57) ABSTRACT

A transmission clutch module includes an inner race, an outer race, and a plurality of race engaging pawls adapted to selectively secure the races together in either a locked position or an unlocked position. The clutch module includes 5 an actuator cam configured to be moved between two angularly spaced positions to control the pawls. The inner race is comprised of two axially spaced inner race plates axially secured together by rivets for retaining, and accommodating angular limited movements of the pawls. The pawls are circumferentially disposed about the inner race plates, and are radially outwardly biased by springs 10 to engage the outer race, unless blocked by the actuator cam.
(Continued)

The pawls are weighted at one end, so that at a threshold speed of the inner race, they can overcome spring resistance to disengage from both the actuator cam and the outer race.

15 Claims, 3 Drawing Sheets

(51) Int. Cl.
    *F16D 43/14*     (2006.01)
    *F16D 41/12*     (2006.01)
    *F16D 11/16*     (2006.01)
    *F16D 25/00*     (2006.01)
    *F16D 43/16*     (2006.01)

(52) U.S. Cl.
    CPC ............. *F16D 43/14* (2013.01); *F16D 43/16* (2013.01); *F16D 2043/145* (2013.01)

(56) References Cited

U.S. PATENT DOCUMENTS

| | | |
|---|---|---|
| 6,905,009 B2 | 6/2005 | Reed |
| 7,101,306 B2 | 9/2006 | Blair |
| 7,743,678 B2* | 6/2010 | Wittkopp ................ F16D 41/16 192/43.1 |
| 8,051,959 B2 | 11/2011 | Eisengruber |
| 8,267,231 B2 | 9/2012 | Holmes |
| 2004/0110598 A1 | 6/2004 | Blair |
| 2009/0084653 A1 | 4/2009 | Holmes |
| 2014/0102844 A1* | 4/2014 | Greene ................... F16D 27/09 192/45.1 |
| 2015/0060222 A1* | 3/2015 | Showalter ............... F16D 41/16 192/43.1 |
| 2015/0176662 A1* | 6/2015 | Lee ....................... F16D 25/061 192/45.1 |
| 2015/0204390 A1* | 7/2015 | Kimes ..................... F16D 27/09 192/84.8 |
| 2015/0204391 A1* | 7/2015 | Kimes ..................... F16D 27/09 192/84.8 |
| 2015/0204392 A1* | 7/2015 | Kimes ..................... F16D 27/09 192/46 |

FOREIGN PATENT DOCUMENTS

| | | | |
|---|---|---|---|
| JP | 2004-144218 A | 5/2004 | |
| JP | 2004144218 A | 5/2004 | |
| WO | WO 2009/132056 A2 | 10/2009 | |
| WO | WO 2009-132056 B2 | 10/2009 | |
| WO | WO 2009132056 A2 | 10/2009 | |
| WO | WO 2010-056497 A2 | 5/2010 | |
| WO | WO 2014-120595 A1 | 8/2014 | |

OTHER PUBLICATIONS

European Search Report Application No. EP 14 746273 reported on Oct. 13, 2016.

Chinese Office Action for related Application No. 2014800051976 dated Nov. 8, 2016.

* cited by examiner

MULTI-MODE CLUTCH MODULE

FIELD OF DISCLOSURE

The present disclosure relates generally to overrunning clutches for automotive transmissions, and more particularly to multiple mode clutches employed in such transmissions.

BACKGROUND OF DISCLOSURE

An automotive vehicle typically includes an internal combustion engine containing a rotary crankshaft configured to transfer motive power from the engine through a driveshaft to turn the wheels. A transmission is interposed between engine and driveshaft components to selectively control torque and speed ratios between the crankshaft and driveshaft. In a manually operated transmission, a corresponding manually operated clutch may be interposed between the engine and transmission to selectively engage and disengage the crankshaft from the driveshaft to facilitate manual shifting among available transmission gear ratios.

On the other hand, if the transmission is automatic, the transmission will normally include an internal plurality of automatically actuated clutches adapted to dynamically shift among variously available gear ratios without requiring driver intervention. Pluralities of clutches, also called clutch modules, are incorporated within such transmissions to facilitate the automatic gear ratio changes.

In an automatic transmission for an automobile, anywhere from three to ten forward gear ratios may be available, not including a reverse gear. The various gears may be structurally comprised of inner gears, intermediate gears such as planet or pinion gears supported by carriers, and outer ring gears. Specific transmission clutches may be associated with specific sets of the selectable gears within the transmission to facilitate the desired ratio changes.

Because automatic transmissions include pluralities of gear sets to accommodate multiple gear ratios, friction drag is a constant issue; the drag arises from mechanical interactions of the various parts employed. Much effort has been directed to finding ways to reduce friction drag within automatic transmission components and systems.

For example, one of the clutch modules of an automatic transmission associated with first (low) and reverse gear ratios may be normally situated at the front of the transmission and closely adjacent the engine crankshaft. The clutch may have an inner race and an outer race disposed circumferentially about the inner race. One of the races, for example the inner race, may be drivingly rotatable in only one direction. The inner race may be selectively locked to the outer race via an engagement mechanism such as, but not limited to, a roller, a sprag, or a pawl, as examples. In the one direction, the inner race may be effective to directly transfer rotational motion from the engine to the driveline.

Within the latter system, the outer race may be fixed to an internal case or housing of an associated planetary member of the automatic transmission. Under such circumstances, in a first configuration the inner race may need to be adapted to drive in one rotational direction, but freewheel in the opposite direction, in a condition referred to as overrunning. Those skilled in the art will appreciate that overrunning may be particularly desirable under certain operating states, as for example when a vehicle is traveling downhill. Under such circumstances, a driveline may occasionally have a tendency to rotate faster than its associated engine crankshaft. Providing for the inner race to overrun the outer race may avoid damage to the engine and/or transmission components.

In a second configuration, such as when a vehicle may be in reverse gear, the engagement mechanisms may be adapted for actively engaging in both rotational directions of the inner race, thus not allowing for the overrunning condition in the non-driving direction.

Above certain thresholds of rotational speed, the need for interaction of the engagement mechanisms, particularly those associated with the first (low) and/or reverse gear ratios, may become unnecessary. Thus, rather than contributing to drag, for example at highway speeds, there is substantial motivation to reduce and/or avoid interaction of the engagement mechanisms with any of the clutch parts, particularly those associated with the low/reverse clutch module.

SUMMARY OF DISCLOSURE

In accordance with one aspect of the disclosure, a multi-mode clutch module is disclosed. The clutch module comprises an inner race; a fixed outer race disposed concentrically about the inner race, and a plurality of engagement mechanisms circumferentially disposed between the inner and outer races. Each engagement mechanism is adapted to provide a locked position, wherein the mechanism locks the inner race to the outer race in a driving rotational direction, and an unlocked position that allows the inner race to freewheel in an opposite, non-driving, rotational direction.

In accordance with another aspect, the multi-mode clutch module includes an actuator cam plate having two positions, one position locking a first, driving directional, rotational motion of the inner race, but allowing the inner race to freewheel in an opposed second direction.

In accordance with another aspect, the actuator cam of the clutch module incorporates a second position that assures the locking of the inner race in both directions of rotational motion with respect to the outer race.

In yet another aspect, the engagement mechanisms are adapted to centrifugally disengage from the races at a specific rotational speed of the inner race.

These and other aspects and features of the present disclosure may be better appreciated by reference to the following detailed description and accompanying drawings.

It should be understood that the drawings are not to scale, and that the disclosed embodiments are illustrated only diagrammatically and in partial views. It should also be understood that this disclosure is not limited to the particular embodiments illustrated herein.

DETAILED DESCRIPTION

Figure 1:
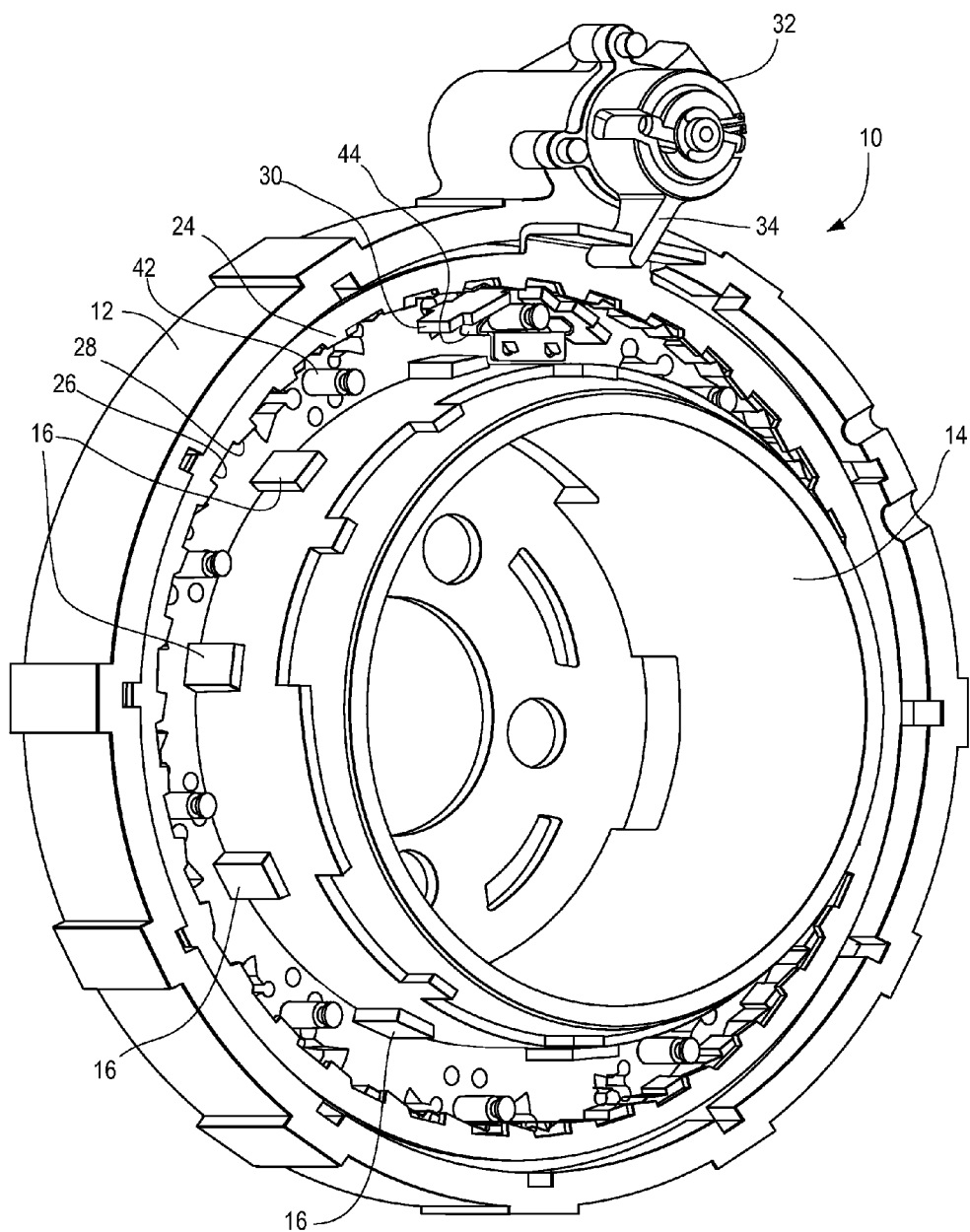
FIG. 1 is a perspective view of an automatic transmission clutch module constructed in accordance with the present disclosure, shown with one of its two inner race plates removed to reveal certain details.

Referring to FIG. 1, a clutch module 10 may be adapted to be utilized as a sub-unit of an automatic transmission (not shown). Such a transmission may be employed in a front-wheel driven automobile, for example. The clutch module 10 may include an exterior case or housing 12, as well as an interior driven hub 14 adapted for transfer of power from an engine (not shown) to a vehicular driveline (not shown).

Figure 2:
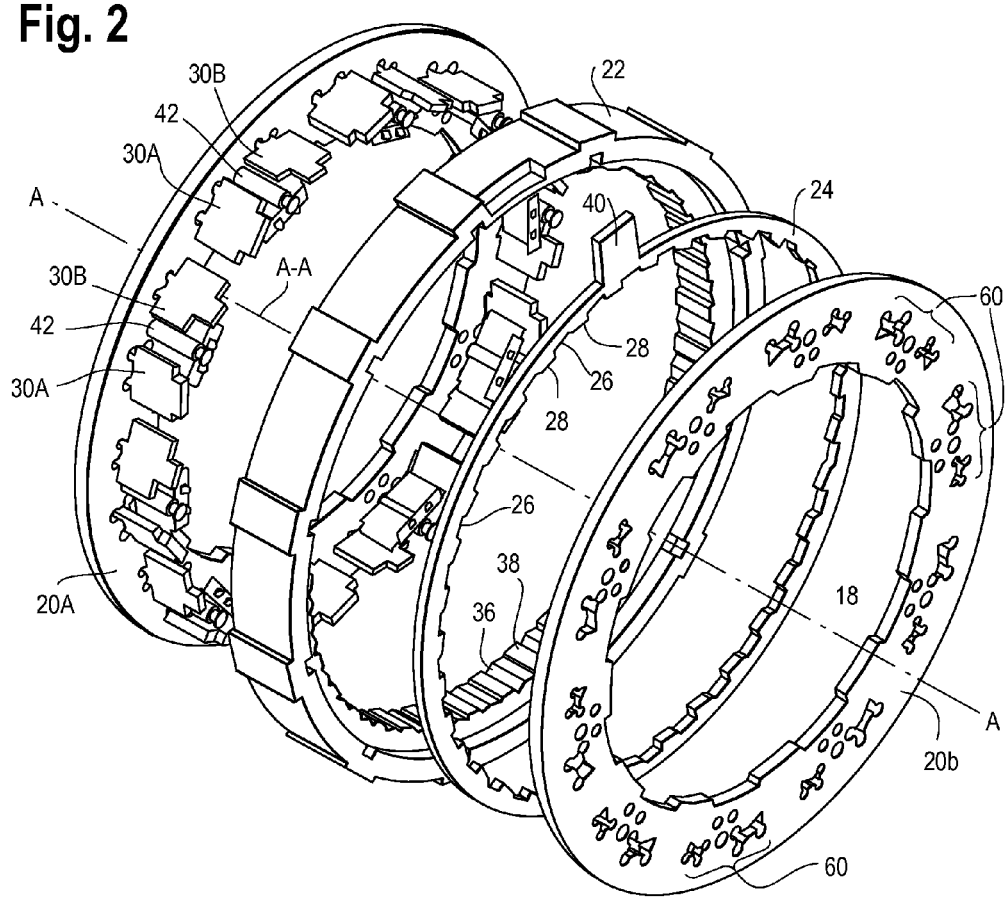
FIG. 2 is an exploded view of various interactive parts of the clutch module of FIG. 1, constructed in accordance with the present disclosure.

Axially oriented, circumferentially spaced cogs 16 are provided on the outside periphery of the interior driven hub 14. Referring now also to FIG. 2, an inner race 20, formed as two plates 20A and 20B spaced along an axis "A-A", is adapted for supporting rotary movement of the plates via the cogs 16. For this purpose, the plates 20A and 20B have circumferentially spaced detents 18 on their inside peripheries adapted to engage the cogs 16.

With specific reference now to FIG. 2, an outer race 22 is situated intermediately or between the two inner race plates 20A and 20B. Although the inner race plates 20A and 20B are specifically displayed in this disclosure as ring structures, other configurations may be suitable for use within the scope of this disclosure. The outer race 22 is rotationally fixed with respect to the interior of the exterior case or housing 12 as shown within the multi-mode clutch module 10, and an actuator cam 24 is situated between the outer race 22 and the plate 20B of the inner race 20. The actuator cam 24 is adapted to be rotated over a small angle about the axis A-A between two circumferentially spaced positions, as further described hereinbelow. Within its interior periphery, the actuator cam 24 incorporates a strategically situated array of circumferentially spaced recesses, herein called slots 26, defined by and situated between projections, herein called cam teeth 28. The slots 26 and cam teeth 28 are adapted to interact with pawls 30, as may now be described.

As disclosed, the pawls 30 are elongated hardened steel members circumferentially positioned about the axis A-A of the clutch module 10. Alternatively, the pawls maybe forgings or other manufactured structures, otherwise generally adapted to handle required loads of engagement as necessary for any particular clutch design. The pawls are situated so as to interact with both the inner race 20 and the outer race 22, and are arranged in sets of opposed pairs, 30A and 30B. The actuator cam 24 is adapted to control interactions of the pawls 30A and 30B between the inner race 20 and the outer race 22, as further described below.

Figure 3:
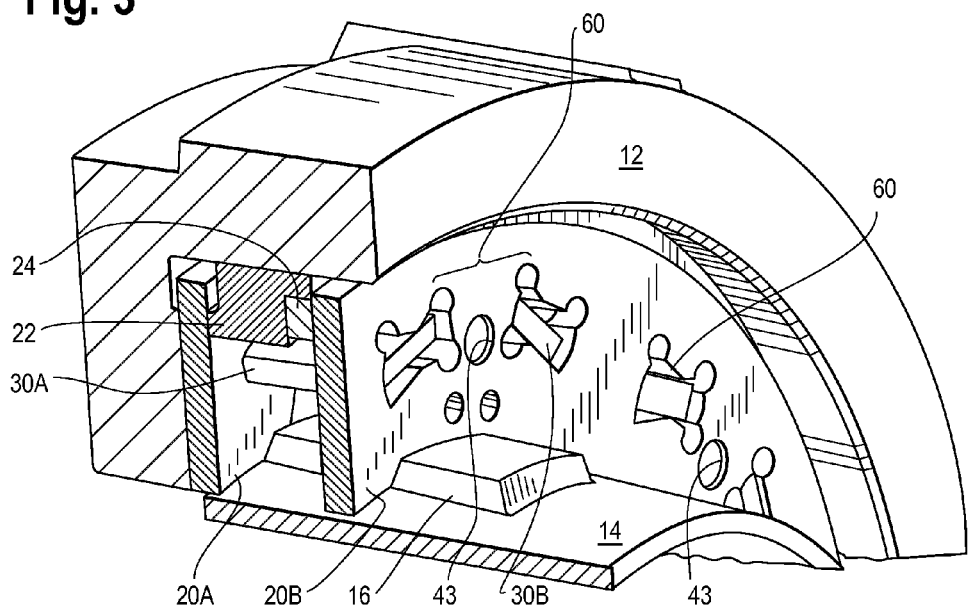
FIG. 3 is a perspective cross-sectional view of a portion of a fully assembled clutch module of FIG. 1.

A hydraulic actuator 32 (FIG. 1) engages an actuator coupling 34 to move an actuator tab 40 (FIG. 2) on the actuator cam 24 between the two angularly spaced positions noted above. Referring now also to FIG. 3, the inner race plates 20A and 20B, the outer race 22, and the actuator cam 24 are shown assembled within the cross-sectioned partial view of the clutch module 10. It will be appreciated that axially extending rivets 42 (FIG. 2) are used to secure the two inner race plates 30A and 30B together. The rivets 42 extend through apertures 43 (FIG. 3) in each of the plates 20A and 20B to hold the two plates rigidly together, and to thus assure against any relative rotation with respect to the plates. In lieu of the rivets 42, other structural fasteners may be employed within the scope of this disclosure to secure the inner race plates 20A, 20B together.

In view of the foregoing, it will be appreciated that the actuator 32 ultimately controls the actuator tab 40 which, in turn, moves the actuator cam 24 between two distinct angular positions. Thus, the positioning of the pawls 30A and 30B, as axially retained between the riveted inner race plates 20A and 20B, is directly controlled by the actuator cam 24 against forces of springs 44, as further described below.

Referring now specifically to FIG. 3, it will be noted that the two inner race plates 20A and 20B, are adapted to rotate within the case or housing 12. Assuming the actuator cam 24 is in the first of its two specific angular positions, one set of the pawls, e.g. pawls 30B, will lock the inner race 20 (i.e., plates 20A and 20B) to the outer race 22, to drivingly rotate in one direction, for example counterclockwise. In the opposite rotational direction, e.g. clockwise, the pawls 30A will be unlocked whenever the clutch module 10 in an automatic first or drive gear configuration so as to permit freewheeling of the inner race 20 relative to the outer race 22.

Alternatively, when the actuator cam 24 is in the second of its two angular positions, both sets of pawls 30A and 30B, will lock the inner race to the outer race in either rotational direction to accommodate a reverse or manual first gear configuration; i.e. when in a mode during which no over-running is desirable. In both configurations of the multi-mode clutch, it will be noted that the outer race 22 remains non-rotatable relative to the exterior case or housing 12. For accommodating interactions with the pawls 30A and 30B, the inner circumference of the outer race 22 (FIG. 2; see bottom portion thereof) contains circumferentially spaced notches 36, each defined by and situated between pairs of radially inwardly projecting cogs 38.

Figure 4A:
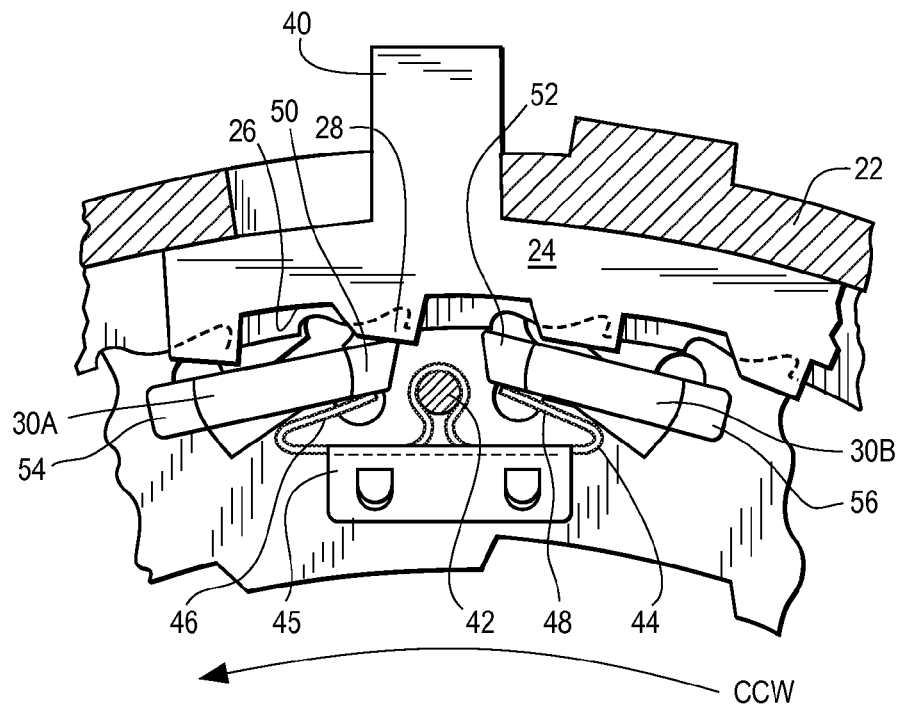
FIG. 4A is an enlarged side view of a portion of the clutch module of FIG. 1, again with one of two inner race plates removed to reveal a pair of engagement mechanisms interacting with a cam actuator, showing a locked position in the driving rotational direction of the inner race, and a freewheel position in the opposite non-driving rotational direction (one-way mode).
Figure 4B:
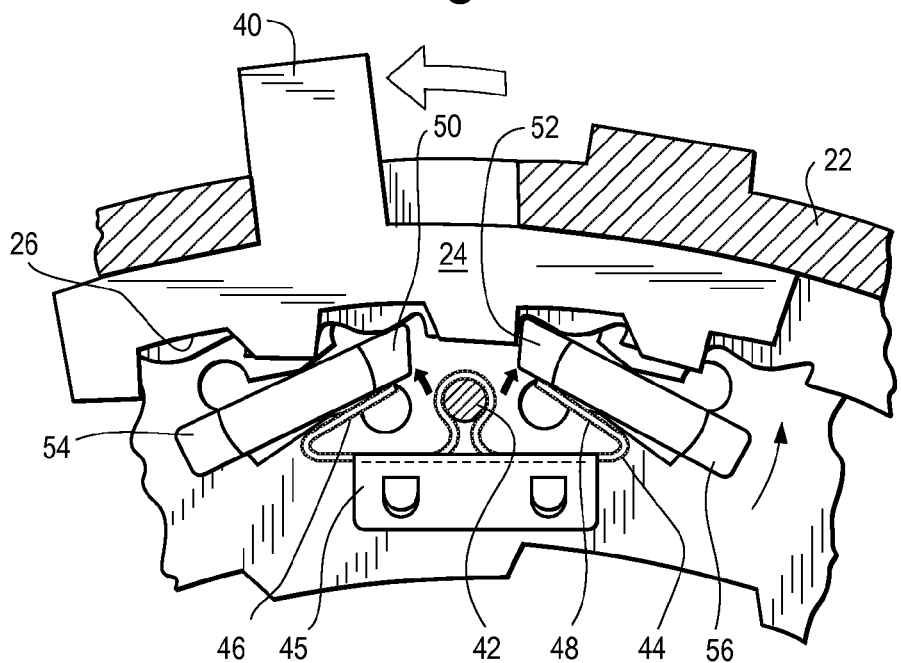
FIG. 4B is a side view of the same engagement mechanisms of FIG. 4A, but shown with the inner race subjected to locked positions in both driving and non-driving rotational directions (locked mode).

Referring now to FIGS. 4A and 4B, first and second angular positions of the actuator tab 40 are depicted, respectively. In FIG. 4A, the actuator tab 40 is shown in a first (angularly rightward) selectable position, representative of a first mode. In the latter configuration, the actuator cam 24 is positioned so that toe ends 50 of the pawls 30A are blocked by cam teeth 28 from engagement with notches 36, and hence with the cogs 38 on the interior of the outer race 22. As such the inner race 20 is enabled to freewheel relative to the outer race 22, and to thus provide for an overrunning condition when the inner race 20 is rotating clockwise as shown. Conversely, however, the position of the actuator cam 24 allows of the toe ends 52 of the pawls 30B to engage the actuator slots 26 of the actuator cam 24, and to thereby directly engage the cogs 38 of the outer race 22 to lock the inner and outer races, 20 and 22 together whenever the inner race 20 undergoes a driving, or counterclockwise rotational movement.

In FIG. 4B, the actuator tab 40 is shown in a second (angularly leftward) selectable position, representative of a manual first or reverse gear mode. In the latter configuration, the actuator cam 24 is positioned so that the toe ends 50, 52 of both sets of the pawls 30A and 30B engage the actuator slots 26 of the actuator cam 24, and interact with the outer race 22 as described above to lock the inner race 20 to the outer race 22, irrespective of the rotational direction of the inner race 20.

Continuing reference now to both FIGS. 4A and 4B, the pawls 30A and 30B are asymmetrically shaped, and reversely identical. Each pair of the opposed pawls is movably retained within its own bowtie-shaped pawl aperture 60 (FIG. 3) of the inner race plates 20A and 20B as shown. Each individual pawl 30A, 30B is urged radially outwardly via a single spring 44. Each spring has a base 45, and a pair of spring arms 46 and 48. The spring arms 46 bear against the bottoms of the pawls 30A, while the spring arms 48 bear against the bottoms of the pawls 30B, each to urge respective toe ends 50, 52 into engagement with the cogs 38 of the outer race 22.

Opposite each toe end 50 and 52, each pawl 30A and 30B has a heel end 54 and 56, respectively (FIGS. 4A and 4B). As already described, a slot 26 in the interior circumference of the actuator cam 24 may be selectively positioned such that each toe end 50, 52 may engage a notch 36 (FIG. 2) of the outer race 22 to permit the toe ends to engage outer race cogs 38 (FIG. 2) in the interior circumference of the outer race 22 to physically lock the inner and outer races together.

Operationally, radially inwardly depending actuator cam teeth 28 are adapted to selectively block such toe ends 50, 52 of the pawls 30 from being urged radially outwardly by respective spring arms 46, 48 and into notches 36. The interaction of the cam teeth 28 with such toe ends 50, 52 defines the mechanism that permits the earlier described freewheeling of the inner race 20 relative to the outer race 22 as, for example, in the case of the above-described configuration for manual first or reverse gear.

In the immediate disclosure, the heel ends 54 and 56 are designed to contain more mass than the toe ends 50, 52, so that at a particular threshold rotational speed of the inner race 20, the heel ends will tend to swing radially outwardly under centrifugal forces of rotation. This action will cause the toe ends 50, 52 to become disengaged from notches 36 of the outer race 22. As such, the inner race 20 will become disengaged from the outer race 22. Under such forces, the toe ends of pawls 30A will bear down against the spring arms 46, while the toe ends 52 of pawls 30B will respectively bear against spring arms 48. In each case, the differential in mass between heel and toe ends must be designed to 1) overcome the resistive forces imposed by the respective spring arms 46, 48 of the springs 44, and 2) achieve such centrifugal force induced load against the respective spring arms 46, 48 at a specific rotational speed threshold.

Thus, in either of the first or reverse gear configurations of the clutch module 10, and at rotational speeds of the inner race 20 in excess of a threshold of 500 RPM, for example, the pawls 30A and 30B of the clutch module 10 are adapted to become disengaged under centrifugal forces imposed thereon by a predetermined speed of rotation. At such threshold speed, the centrifugal forces will be sufficient to overcome the radially opposing forces of the spring arms 46, 48, and the toe ends 50, 52 of the pawls will disengage. As such, this disclosure offers an effective way to reduce and/or avoid parasitic drag loads within the clutch module.

A method of making a multi-mode clutch module may include steps of providing a pair of ring plates to form an inner race, and a separate ring structure to form an outer race, with the ring plates including reversely identical pawl apertures. An actuator cam and individual pawls are also provided; the pawls may be inserted into the pawl apertures of a first of the pair of ring plates, and after positioning the outer race and the actuator cam, the second ring plate is assembled so as to sandwich the outer race and actuator cam between the two ring plates along a common axis, while assuring that the pawls are retained within each set of then aligned pawl apertures. The assembled inner race, pawls, outer race and actuator cam are inserted into a transmission clutch housing in a manner such that the outer race is non-rotatably secured to the housing, and such that in operation each of the pawls is adapted to disengage from the actuator plate and the outer race under centrifugal forces at a predetermined rotational speed of the inner race.

The method of making the multi-mode clutch module may also incorporate pawls that comprise elongated hardened steel members having heel ends and toe ends, with the heel ends containing more mass than the toe ends.

INDUSTRIAL APPLICABILITY

The clutch module of this disclosure may be employed in a variety of vehicular applications, including but not limited to, automobiles, trucks, off-road vehicles, and other machines of the type having engines, automatic transmissions, and drivelines.

The disclosed clutch module offers a unique approach to avoiding parasitic drag associated with pawls generally employed to engage inner and outer races of clutches in automatic transmissions. Each pawl may be individually and movably situated between a pair of riveted rotatable inner races, each pawl having its axially oriented lateral ends captured within and/or between pairs of opposed notches for permitting limited angular motion.

To the extent that the heel ends of each pawl are designed to contain more mass, the heel ends may be appropriately weighted so that the toe ends of the pawls may become disengaged from their associated outer race notches at predetermined threshold rotational speeds of the inner race. This approach provides for a relatively simple and reliable reduction of parasitic drag above speeds not requiring continued engagement or interaction of inner and outer race members in, for example, a first (low) and reverse clutch module of an automatic transmission.

What is claimed is:

1. A multi-mode clutch module, comprising:
    an inner race comprising pair of inner race plates defining an axis, the plates extending radially about the axis and being axially spaced apart, each plate including a plurality of circumferentially spaced pawl apertures;
    an outer race radially disposed about the same axis, and extending circumferentially about the axis and between the inner race plates, the outer race including a plurality of circumferentially spaced radially inwardly depending cogs within an inner periphery thereof, each pair of cogs defining a notch therebetween;
    at least one actuator cam situated orthogonally to the axis, and adapted for limited angular movement about the axis between two selectable positions;
    opposed pairs of pawls supported within the plurality of circumferentially disposed pawl apertures, the pawls being angularly movable within the spaced pair of inner races;
    wherein in a first selectable actuator cam position, rotation of the inner races in one rotational direction causes a first of the pairs of opposed pawls to be urged into a notch of the outer race, and to engage a cog thereof, and to thereby lock the inner and outer races together, while rotation of the inner races in an opposite rotational direction causes the second of the pairs of opposed pawls to permit freewheeling of the inner race relative to the outer race;
    wherein in the second selectable actuator cam position, rotation of the inner race in either rotational direction causes the pawls to lock the inner race to the outer race; and
    wherein at a specific rotational speed, each pawl of each of the opposed pairs of pawls are adapted to centrifugally disengage from any contact with the actuator cam and with the outer race to reduce parasitic drag within the clutch module.

2. The multi-mode clutch module of claim 1, wherein the inner and outer races comprise circular rings.

3. The multi-mode clutch module of claim 1, wherein the outer race is positioned circumferentially about and between the pair of inner race plates.

4. The multi-mode clutch module of claim 1, wherein each pawl comprises a toe end and a heel end, and wherein the heel end contains more mass than the toe end.

5. The multi-mode clutch module of claim 1, wherein each pair of opposed pawls is urged outwardly by an arm of a single spring structure.

6. The multi-mode clutch module of claim 5, wherein the mass of each of the pairs of opposed pawls centrifugally overcomes the force of its associated spring arm at a threshold rotational speed of the inner race.

7. The multi-mode clutch module of claim 5, wherein the mass of the heel end of each of the pairs of opposed pawls overcomes the force of its associated spring arm at a threshold rotational speed of the inner race.

8. The multi-mode clutch module of claim 1, wherein the actuator cam comprises a circular ring disposed between the outer race and one of the inner race plates.

9. The multi-mode clutch module of claim 1, wherein the inner race plates are secured rigidly together by a plurality of axially extending rivets adapted to hold the pawl apertures for each pawl in axial alignment.

10. A clutch module, comprising:
   an inner race comprising a pair of plates that define an axis, each plate having circumferentially disposed, symmetrically aligned apertures;
   an outer race situated intermediately of the plates, and axially aligned with the inner race;
   a plurality of engagement mechanisms disposed radially between the inner and outer races, each engagement mechanism including a locked position, wherein the engagement mechanism locks the inner race and outer race together, and an unlocked position that permits at least the inner race to freewheel relative to the outer race; and
   an actuator cam plate having two angularly spaced positions, including a first position wherein some of engagement mechanisms are set to freewheel in a non-driving direction, and a second position wherein the entire plurality of engagement mechanisms are locked in a driving as well as non-driving direction;
   wherein all of the engagement mechanisms become centrifugally disengaged from both the actuator and the outer race at a specific rotational speed of the inner race.

11. The clutch module of claim 10, wherein the inner and outer races comprise circular rings.

12. The clutch assembly of claim 10, wherein the outer race is positioned circumferentially about and between the pair of inner race plates.

13. The clutch module of claim 10, wherein each pawl comprises a toe end and a heel end, and wherein the heel end contains more mass than the toe end.

14. The clutch module of claim 10, wherein each pair of opposed pawls is urged outwardly by an arm of a single spring structure.

15. The clutch module of claim 14, wherein each of the pairs of opposed pawls centrifugally overcomes the force of its associated spring arm at a threshold rotational speed of the inner race.

* * * * *